(12) United States Patent
Imaizumi et al.

(10) Patent No.: US 9,163,177 B2
(45) Date of Patent: Oct. 20, 2015

(54) MOLDED PRODUCT INJECTION-MOLDED FROM LIQUID CRYSTALLINE RESIN COMPOSITION, LIQUID CRYSTALLINE RESIN COMPOSITION FOR CONTACT ELECTRONIC COMPONENT, AND CONTACT ELECTRONIC COMPONENT

(75) Inventors: Toyohiro Imaizumi, Kyoto (JP); Hitoshi Hayashi, Kyoto (JP)

(73) Assignee: OMRON Corporation, Kyoto-shi, Kyoto (JP)

( * ) Notice: Subject to any disclaimer, the term of this patent is extended or adjusted under 35 U.S.C. 154(b) by 265 days.

(21) Appl. No.: 13/990,305

(22) PCT Filed: Mar. 16, 2011

(86) PCT No.: PCT/JP2011/056267
§ 371 (c)(1),
(2), (4) Date: May 29, 2013

(87) PCT Pub. No.: WO2012/073532
PCT Pub. Date: Jun. 7, 2012

(65) Prior Publication Data
US 2013/0240783 A1    Sep. 19, 2013

(30) Foreign Application Priority Data

Nov. 30, 2010  (JP) ................................. 2010-267625

(51) Int. Cl.
| | | |
|---|---|---|
| *C09K 19/38* | (2006.01) | |
| *C08L 67/00* | (2006.01) | |
| *C08K 7/02* | (2006.01) | |
| *C08K 7/14* | (2006.01) | |
| *B29C 70/06* | (2006.01) | |
| *C09K 19/02* | (2006.01) | |
| *B29C 45/00* | (2006.01) | |
| *B29K 105/00* | (2006.01) | |

(52) U.S. Cl.
CPC ............. *C09K 19/02* (2013.01); *B29C 45/0001* (2013.01); *B29C 45/0005* (2013.01); *C08K 7/02* (2013.01); *C08K 7/14* (2013.01); *C09K 19/3809* (2013.01); *B29K 2105/0079* (2013.01); *C08L 67/00* (2013.01)

(58) Field of Classification Search
CPC   C09K 19/3809; B29C 45/0005; B29C 70/06; B29C 70/12; B29K 2105/0079; B29K 2105/12; C08L 67/00; C08K 7/02; C08K 7/14; C08K 2201/004; C08K 2201/006
See application file for complete search history.

(56) References Cited

FOREIGN PATENT DOCUMENTS

| | | |
|---|---|---|
| JP | 64-074265 A | 3/1989 |
| JP | 09-280345 A | 10/1997 |
| JP | 2008-133416 A | 6/2008 |
| JP | 2009-191088 A | 8/2009 |

OTHER PUBLICATIONS

International Search Report issued in PCT/JP2011/056267 mailed on May 24, 2011 (4 pages).
Written Opinion of the International Searching Authority issued in PCT/JP2011/056267 mailed on May 24, 2011 (4 pages).
Patent Abstracts of Japan for Publication No. 64-074265, Publication Date: Mar. 20, 1989 (1 Page).

*Primary Examiner* — Shean C Wu
(74) *Attorney, Agent, or Firm* — Osha Liang LLP (57) ABSTRACT

An object of the present invention is to provide a molded product in which an area, which is exposed on a surface of the molded product, of a fibrous filler accounts for a predetermined percentage or less of a surface area of the molded product so that falling-out of the fibrous filler and resin dust generation are suppressed, a liquid crystalline resin composition in which a percentage of a fibrous filler having a fiber length of 200 μm or longer and the like show predetermined values, and a contact electronic component employing the molded product. In order to achieve the object, the molded product of the present invention is a molded product, formed by injection molding of a liquid crystalline resin composition including a fibrous filler and a liquid crystal polymer, the fibrous filler having an area that is exposed on a surface of the molded product, the area of the fibrous filler accounting for 0.4% or less of a surface area of the molded product.

5 Claims, 2 Drawing Sheets

MOLDED PRODUCT INJECTION-MOLDED FROM LIQUID CRYSTALLINE RESIN COMPOSITION, LIQUID CRYSTALLINE RESIN COMPOSITION FOR CONTACT ELECTRONIC COMPONENT, AND CONTACT ELECTRONIC COMPONENT

TECHNICAL FIELD

The present invention relates to a molded product formed by injection molding of a liquid crystalline resin composition, a liquid crystalline resin composition for a contact electronic component, and a contact electronic component. More specifically, the present invention relates to a molded product in which an area, which is exposed on a surface of the molded product, of a fibrous filler accounts for a predetermined percentage or less of a surface area of the molded product so that falling-out of the fibrous filler and resin dust generation are suppressed, a liquid crystalline resin composition for a contact electronic component in which a percentage of a fibrous filler having a fiber length of 200 μm or longer and the like show predetermined values, and a contact electronic component employing the molded product.

BACKGROUND ART

There has been an increasing demand for contact electronic components such as relays, switches, and connectors which are compact and highly heat-resistant. For satisfying such a demand, a liquid crystalline resin composition, which can be molded into a thin-walled form and is highly heat-resistant, has been employed. Note, however, that such a liquid crystalline resin composition contains a fibrous filler such as glass fibers so that a liquid crystal polymer can be molded more easily. Therefore, because of its characteristics, from a molded product formed by injection molding of the liquid crystalline resin composition, the fibrous filler may fall out and resin dust may be generated. Such a fibrous filler and resin dust are insulators. Therefore, if the fibrous filler and/or the resin dust become caught in a gap between contact points of a contact electronic component, contact failure may occur in the contact electronic component. This has been a problem.

For the purpose of suppressing falling-out of a fibrous filler, there has been suggested a technique of employing a liquid crystalline resin composition which contains a fibrous filler having a limited fiber length or employing a liquid crystalline resin composition in which a distribution of a fibrous filler is limited (Patent Literature 1).

CITATION LIST

Patent Literatures

Patent Literature 1
Japanese Patent Application Publication, Tokukai No. 2009-191088 A (Publication Date: Aug. 27, 2009)

SUMMARY OF INVENTION

Technical Problem

However, the technique described in Patent Literature 1 has not reached a point where, in practical use such as reflow, no fibrous filler is exposed on a surface of a molded product even after heat history. When producing a contact-type component such as a relay, it is necessary that the contact-type component be subjected to reflow. However, if the fibrous filler is exposed on the surface of the molded product after the reflow, the fibrous filler becomes likely to fall out and the contact electronic component becomes a component that is prone to contact failure. Further, Patent Literature 1 does not mention resin dust generation. That is, there have been no techniques which are good enough to suppress resin dust generation on a surface of a molded product.

The present invention has been made in view of such a problem, and an object of the present invention is to provide a molded product in which an area, which is exposed on a surface of the molded product, of a fibrous filler accounts for a predetermined percentage or less of a surface area of the molded product so that falling-out of the fibrous filler and resin dust generation are suppressed, a liquid crystalline resin composition for a contact electronic component in which a percentage of a fibrous filler having a fiber length of 200 μm or longer and the like show predetermined values, and a contact electronic component employing the molded product.

Solution to Problem

In order to attain the above object, the inventors of the present invention have found that, in a case where a molded product formed by injection molding of a liquid crystalline resin composition containing a fibrous filler and a liquid crystal polymer is arranged such that an area, which is exposed on a surface of the molded product, of the fibrous filler accounts for a predetermined percentage or less of a surface area of the molded product, falling-out of the fibrous filler and resin dust generation from the molded product are effectively suppressed. On the basis of this finding, the inventors have completed the present invention.

That is, a molded product of the present invention is a molded product, formed by injection molding of a liquid crystalline resin composition including a fibrous filler and a liquid crystal polymer, the fibrous filler having an area that is exposed on a surface of the molded product, the area of the fibrous filler accounting for 0.4% or less of a surface area of the molded product.

In the molded product, the fibrous filler and the liquid crystal polymer are joined together by anchoring effect. Since the joining by the anchoring effect is weaker than a chemical bond between resins, the following occurs. In a case where the fibrous filler is exposed on the surface of the molded product, when a force (e.g., friction) is applied, joined surfaces of the fibrous filler and the liquid crystal polymer are prone to the force. As a result, the fibrous filler falls out and/or the liquid crystal polymer generates resin dust and the resin dust falls off.

According to the arrangement, since the area, which is exposed on the surface of the molded product, of the fibrous filler accounts for as low as 0.4% or less of the surface area of the molded product, falling-out of the fibrous filler and resin dust generation can be suppressed even if a force (e.g., friction) is applied. Further, less fibrous filler is exposed on the surface of the molded product even after heat history in practical use such as reflow (described later). Therefore, in a case where the molded product is used in a contact electronic component, the contact electronic component is much less prone to contact failure.

A molded product of the present invention is formed by a liquid crystalline resin composition for a contact electronic component, including a fibrous filler and a liquid crystal polymer, 2.5% or less of the fibrous filler having a fiber length of 200 μm or longer.

According to the arrangement, since the molded product is formed by injection molding of the liquid crystalline resin composition containing a very small amount of long fibrous fillers, the falling-out of the fibrous filler and resin dust generation from the molded product are fully suppressed. Accordingly, the molded product can be suitably used as a material for a contact electronic component.

A contact electronic component of the present invention includes a molded product of the present invention.

As described above, according to a molded product of the present invention, falling-out of the fibrous filler and resin dust generation from the molded product are fully suppressed and an exposed area increase (an increase in exposed area of fibrous filler) is fully suppressed even after heat history such as reflow. Therefore, according to the arrangement, it is possible to provide a contact electronic component such as a relay, a switch or a connector which is much less prone to contact failure and stably provides desired performances.

Advantageous Effects of Invention

According to the present invention, it is possible to fully suppress falling-out of a fibrous filler and resin dust generation even when a force (e.g., friction) is applied to a molded product. Further, less fibrous filler is exposed on a surface of the molded product even after heat history in practical use such as reflow. This makes it possible to provide a contact electronic component which is much less prone to contact failure and is capable of stably providing desired performances.

Additional objects, features, and strengths of the present invention will be made clear by the description below. Further, the advantages of the present invention will be evident from the following explanation in reference to the drawings.

DESCRIPTION OF EMBODIMENTS

The following description will discuss an embodiment of the present invention in detail. Note that, in the specification, a range expressed as "A to B" means "not less than A but not more than B".

Further, the patent literature cited in this specification is of assistance as a reference in this specification.

(1. Molded Product Formed by Injection Molding of Liquid Crystalline Resin Composition Containing Fibrous Filler and Liquid Crystal Polymer)

A molded product formed by injection molding of a liquid crystalline resin composition containing a fibrous filler and a liquid crystal polymer in accordance with the present invention is one in which an area, of the fibrous filler, which is exposed on a surface of the molded product accounts for 0.4% or less of a surface area of the molded product.

The term "fibrous filler" in this specification means an inorganic filler made up of fibrous fillers in the form of needles or fibers. Specific examples of such fibrous fillers include: carbon fibers such as glass fibers, Wollastonite, PAN fibers, and Pitch fibers; metal fibers such as stainless steel fibers, aluminum fibers, and brass fibers; and ceramic fibers. Further, the filler can be covered with or modified with (i) a thermoplastic resin such as an ethylene-vinyl acetate copolymer, (ii) a thermosetting resin such as epoxy resin, (iii) a silane compound, (iv) a titanate compound, and/or (v) an aluminum compound. The inorganic filler made up of fibrous fillers in the form of needles or fibers preferably has an average aspect ratio of 2 or more.

The liquid crystal polymer is not particularly limited. However, it is preferable that the liquid crystal polymer is a resin that can form an anisotropic melt phase and has an ester bond(s). Such a resin is for example (i) a liquid crystal polyester resin which forms an anisotropic melt phase and includes structural units selected from aromatic oxycarbonyl units, aromatic dioxy units, aromatic dicarbonyl units and aliphatic dicarbonyl units, and alkylene dioxy units etc. or (ii) a liquid crystal polyesteramide resin which forms an anisotropic melt phase and includes structural units selected from the above-listed structural units, aromatic iminocarbonyl units, aromatic diimino units, and aromatic iminooxy units etc.

Specific examples of the liquid crystal polyester resin include: liquid crystal polyesters each including structural units derived from p-hydroxybenzoic acid and 6-hydroxy-2-naphthoic acid; liquid crystal polyesters each including a structural unit(s) derived from p-hydroxybenzoic acid, a structural unit(s) derived from 6-hydroxy-2-naphthoic acid, and a structural unit(s) derived from an aromatic dihydroxy compound and/or an aromatic dicarboxylic acid; liquid crystal polyesters each including a structural unit(s) derived from p-hydroxybenzoic acid, a structural unit(s) derived from 4,4'-dihydroxybiphenyl, and a structural unit(s) derived from an aromatic dicarboxylic acid such as terephthalic acid and isophthaic acid and/or an aliphatic dicarboxylic acid such as adipic acid and sebacic acid; liquid crystal polyesters each including a structural unit(s) derived from p-hydroxybenzoic acid, a structural unit(s) derived from ethylene glycol, and a structural unit(s) derived from terephthalic acid; liquid crystal polyesters each including a structural unit(s) derived from p-hydroxybenzoic acid, a structural unit(s) derived from ethylene glycol, a structural unit(s) derived from 4,4'-dihydroxybiphenyl, and a structural unit(s) derived from terephthalic acid; liquid crystal polyesters each including a structural unit(s) derived from p-hydroxybenzoic acid, a structural unit(s) derived from ethylene glycol, and a structural unit(s) derived from terephthalic acid and isophthalic acid; liquid crystal polyesters each including a structural unit(s) derived from p-hydroxybenzoic acid, a structural unit(s) derived from hydroquinone, a structural unit(s) derived from 4,4'-dihydroxybiphenyl, and a structural unit(s) derived from terephthalic acid and isophthalic acid; and liquid crystal polyesters each including a structural unit(s) derived from p-hydroxybenzoic acid, a structural unit(s) derived from ethylene glycol, a structural unit(s) derived from an aromatic dihydroxy compound, and a structural unit(s) derived from aromatic dicarboxylic acid such as terephthalic acid, isophthalic acid, and 2,6-naphthalenedicarboxylic acid. Further, examples of the liquid crystal polyesteramide resin include polyesteramides each of which forms an anisotropic molten phase and includes (i) a structural unit(s) selected from aromatic oxycarbonyl units, aromatic dioxy units, aromatic dicarbonyl units and/or aliphatic dicarbonyl units, and alkylene dioxy units etc. and (ii) a p-iminophenoxy unit(s) derived from p-aminophenol.

The ratio by weight of the fibrous filler contained in the liquid crystalline resin composition to the liquid crystal polymer contained in the liquid crystalline resin composition is not particularly limited. However, for the purpose of achieving easier molding of the liquid crystal polymer, the fibrous filler accounts for preferably not less than 25 wt % but not more than 40 wt %, more preferably not less than 33 wt % but not more than 40 wt %, and further preferably not less than 33 wt % but not more than 37 wt %, of the liquid crystalline resin composition.

Note that the ratio by weight as described above does not change even after the liquid crystalline resin composition is injection-molded into a molded product. For example, in a case where a liquid crystalline resin composition containing 35 wt % fibrous filler and 65 wt % liquid crystal polymer is injection-molded into a molded product, the molded product also contains 35 wt % fibrous filler and 65 wt % liquid crystal polymer.

The liquid crystalline resin composition may contain another inorganic filler(s) such as silica, glass beads, a metallic oxide, and/or carbon powder, provided that such inorganic fillers do not impair the characteristics of the liquid crystalline resin composition. The another inorganic filler is preferably a spherical or massive inorganic filler and preferably has an average aspect ratio of less than 2.

The liquid crystalline resin composition is preferably produced by melt-kneading. The melt-kneading can be carried out with use of conventional equipment such as a Banbury mixer, a rubber-covered roll machine, a kneader, a single screw extruder or a twin screw extruder. The liquid crystalline resin composition is further subjected to injection molding, thereby being molded into a molded product having a desired shape.

The phrase "an area of the fibrous filler which area is exposed on a surface of the molded product accounts for 0.4% or less of a surface area of the molded product" means that, in a case where the surface of the molded product is observed under an FE-SEM (scanning electron microscope), a percentage (referred to as a "fibrous filler's exposed area percentage" in this specification) of a sum of an area(s), which is/are exposed on the surface of the molded product, of the fibrous filler with respect to an observed surface area of the molded product is 0.4% or less. A lower fibrous filler's exposed area percentage is more advantageous for attaining the object of the present invention. Therefore, the lower limit of the fibrous filler's exposed area percentage is not particularly limited, and is most preferably 0%.

The fibrous filler's exposed area percentage can be found in the following manner. That is, a surface of a terminal portion (hereinafter referred to as a "terminal end portion") of the molded product, which portion is a portion farthermost from a gate for injection molding, is observed under an FE-SEM with an accelerating voltage of 15 KV at 70× magnification. Next, a compositional image in backscattered electron mode obtained by a YAG detector is analyzed with use of an image processing software. Thereafter, the proportion of a sum of an observed area(s), of the fibrous filler, which is/are exposed on the surface of the molded product to an observed surface area of the terminal end portion is found. In this way, the fibrous filler's exposed area percentage can be found. Note that the "surface of the molded product" includes a depth of 3 μm from the outer surface of the molded product which outer surface is to be observed under an FE-SEM.

Figure 1:
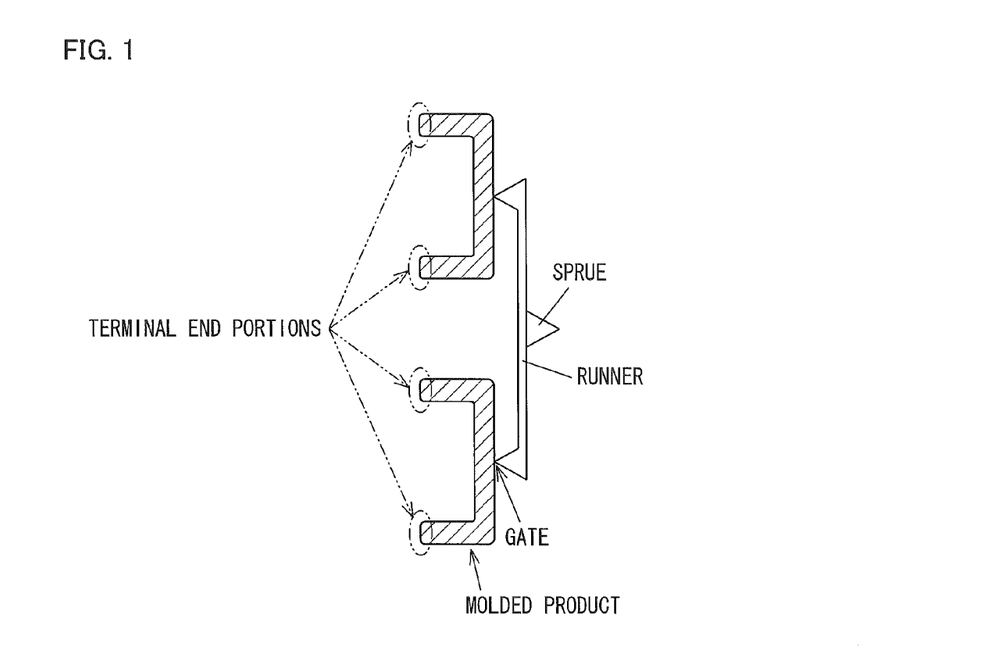
FIG. 1 is a view schematically showing positions of terminal end portions of molded products.

FIG. 1 schematically shows positions of the respective terminal end portions. A target to be observed is a surface of a portion indicated as a "terminal end portion", which is a portion farthermost from a gate through which the liquid crystalline resin composition is injected into a mold. For example, in a case where there are a plurality of terminal end portions as shown in FIG. 1, the fibrous filler's exposed area percentage can be found in the following manner: all the terminal end portions are observed; and a mean value of the fibrous filler's exposed area percentages of the respective terminal end portions is used as the fibrous filler's exposed area percentage of the molded product.

The molded product which has a fibrous filler's exposed area percentage of 0.4% or less is further preferably arranged such that the fibrous filler has a long-fiber percentage of 2.5% or less (the long-fiber percentage means a percentage of fibrous fillers having a fiber length of 200 μm or longer in the fibrous filler contained in the molded product). According to this arrangement, the molded product contains a very small amount of fibrous fillers equal to or longer than 200 μm, which fibrous fillers are likely to be exposed on the surface of the molded product. Therefore, such a molded product is much less prone to falling-out of the fibrous filler and resin dust generation. A lower long-fiber percentage is more advantageous for attaining the object of the present invention. Therefore, the lower limit of the long-fiber percentage is not particularly limited, and is most preferably 0%.

Note that the definition of the "fiber length" is as follows. For example, when a fibrous filler is observed under a microscope, (i) if a two-dimensional shape of the fibrous filler is substantially circular, the "fiber length" means the diameter of the circle, (ii) if the two-dimensional shape of the fibrous filler is substantially elliptical, the "fiber length" means a major axis of the ellipse, (iii) if the two-dimensional shape of the fibrous filler is substantially square, the "fiber length" means the length of a side of the square, and (iv) if the two-dimensional shape of the fibrous filler is substantially rectangular, the "fiber length" means the length of a longer side of the rectangle. Further, if a two-dimensional shape of the fibrous filler is an irregular shape, the phrase "having a fiber length of 200 μm or longer" means that a distance between two points on a periphery of the two-dimensional shape may be 200 μm or longer.

Further, it is more preferable that a number average fiber length of the fibrous filler contained in the molded product is 76 μm or shorter. This is because, if the fibrous filler contained in the molded product has a long-fiber percentage of 2.5% or less and a number average fiber length of 76 μm or shorter, this means that the amount of a fibrous filler having a long fiber length, which is likely to be exposed in the surface of the molded product, contained in the molded product is very small, and thus the object of the present invention can be attained more easily.

The shorter the number average fiber length is, the smaller the percentage of long fibrous fillers is. Therefore, the lower limit of the number average fiber length is not particularly limited. However, for practical use, the lower limit of the number average fiber length is preferably 20 μm. By arranging the molded product such that the number average fiber length is not less than 20 μm but not more than 76 μm, it is possible to significantly reduce the influence of fibrous fillers having a long fiber length while fully maintaining a mechanical strength of the molded product. Note however that, even if the number average fiber length is less than 20 μm, the molded product can still attain the object of the present invention. This is because, even though the mechanical strength of the molded product in such a case is lower than a case where the number average fiber length is not less than 20 μm but not more than 76 μm, the molded product contains a smaller amount of long fibrous fillers.

The fibrous filler's exposed area percentage is more preferably 0.3% or less. The molded product having such a fibrous filler's exposed area percentage is more resistant to external force. For example, even when the molded product is subjected to a strong force in, for example, a scratch test (described later), falling-out of the fibrous filler and resin dust generation are suppressed. Such a molded product can be further suitably used for producing a contact electronic component. As described earlier, a lower fibrous filler's exposed area percentage is more advantageous for attaining the object of the present invention. Therefore, the lower limit of the fibrous filler's exposed area percentage is not particularly limited, and is most preferably 0%.

A molded product in which the fibrous filler's exposed area percentage is 0.3% or less preferably has a long-fiber percentage of 2.5% or less, more preferably further has a number average fiber length of 76 µm or shorter, and especially preferably further has a surface Young's modulus of 3700 MPa or less. According to such a molded product, falling-out of the fibrous filler and resin dust generation are suppressed, and such a molded product is relatively flexible. Therefore, in a case where the molded product is used for a contact electronic component, contact failure is suppressed very effectively.

As described earlier, the long-fiber percentage is most preferably 0%. Further, the lower limit of the number average fiber length is not particularly limited, but is preferably 20 µm in practical use, as described earlier. The lower limit of the surface Young's modulus of the molded product is not particularly limited; however, the lower limit is preferably as close as 2000 MPa, because the Young's modulus of existing liquid crystal polymers is 2000 MPa or more.

The long-fiber percentage and the number average fiber length can be measured by methods described in Examples (described later). The surface Young's modulus means a Young's modulus obtained by measuring a position on the surface of the molded product in which position no fibrous filler is exposed. The surface Young's modulus is measured by a method described in Examples (described later).

A molded product having a fibrous filler's exposed area percentage of 0.4% or less can be produced by injection molding of a liquid crystalline resin composition containing, for example, a liquid crystal polymer and a fibrous filler having a long-fiber percentage of 2.5% or less. In a case where a fibrous filler having a long-fiber percentage of more than 2.5% is used, a molded product having a fibrous filler's exposed area percentage of 0.4% or less can be produced by injection molding of a liquid crystalline resin composition which contains the fibrous filler in an amount small but enough to achieve moldability. In this specification, conditions for the injection molding are not particularly limited; however, the injection molding is preferably carried out at a temperature between 300° C. and 400° C.

Further, by injection molding of a liquid crystalline resin composition containing (i) a fibrous filler having a long-fiber percentage of 2.5% or less and has a number average fiber length of 76 µm or shorter and (ii) a liquid crystal polymer, it is possible to produce a molded product which contains a fibrous filler having a fibrous filler's exposed area percentage of 0.4% or less, a long-fiber percentage of 2.5% or less, and a number average fiber length of 76 µm or shorter.

In order to produce a molded product having a fibrous filler's exposed area percentage of 0.4% or less, it is preferable to use a liquid crystalline resin composition which contains a fibrous fiber in an amount of 25 wt % to 40 wt %, more preferably 33 wt % to 40 wt %, and especially preferably 33 wt % to 37 wt %.

A molded product having a fibrous filler's exposed area percentage of 0.3% or less can be produced by injection molding of for example a liquid crystalline resin composition which (i) contains a fibrous filler having a long-fiber percentage of 2.5% or less and a number average fiber length of 76 µm or shorter, and a liquid crystal polymer and (ii) has a surface Young's modulus of 3700 MPa or less. It is preferable that the liquid crystalline resin composition contains the fibrous filler in an amount of 33 wt % to 37 wt %.

In a case where a fibrous filler to be used does not satisfy the following conditions: the long-fiber percentage is 2.5% or less and the number average fiber length is 76 µm or shorter, a molded product having a fibrous filler's exposed area percentage of 0.3% or less can be produced by injection molding of a liquid crystalline resin composition which has a surface Young's modulus of 3700 MPa or less and contains the fibrous filler in an amount small but enough to achieve moldability.

(2. Liquid Crystalline Resin Composition for Contact Electronic Component)

A liquid crystalline resin composition for a contact electronic component in accordance with the present invention is a liquid crystalline resin composition for a contact electronic component, including a fibrous filler and a liquid crystal polymer, 2.5% or less of the fibrous filler having a fiber length of 200 µm or longer.

Each constituent of the liquid crystalline resin composition has been described. As described earlier, by injection molding of the liquid crystalline resin composition for a contact electronic component, it is possible to produce a molded product having a fibrous filler's exposed area percentage of 0.4% or less.

The fibrous filler preferably has a number average fiber length of 76 µm or shorter. Further, the liquid crystalline resin composition preferably has a surface Young's modulus of 3700 MPa or less. As described earlier, the lower limit of the number average fiber length is not particularly limited, but is preferably 20 µm for practical use. The lower limit of the surface Young's modulus is not particularly limited, but is preferably as close as 2000 MPa because the Young's modulus of existing liquid crystal polymers is 2000 MPa or more.

Note here that examples of a material for a liquid crystalline resin composition of the present invention, i.e., examples of (i) a fibrous filler having a long-fiber percentage of 2.5% or less and (ii) a fibrous filler having a long-fiber percentage of 2.5% or less and a number average fiber length of 76 µm or less, are Milled Fiber EFH 100-01 produced by Central Glass Co., Ltd. and Milled Fiber EPG70M-01N produced by Nippon Electric Glass Co., Ltd., respectively. The liquid crystal polymer used here can be those described in the above (1.), or can be a commercially-available polymer or a synthesized polymer.

A method for synthesizing a liquid crystal polymer is not particularly limited, and a conventional method can be employed. For example, the liquid crystal polymer can be produced in the following manner. That is, p-hydroxybenzoic acid, 4,4'-dihydroxybiphenyl, hydro quinone, terephthalic acid, isophthalic acid, and acetic anhydride in necessary amounts are introduced in a reaction vessel, and they were subjected to a polycondensation reaction to yield a polymer. After the reaction, the polymer is discharged under pressure and subjected to pelletization.

A liquid crystalline resin composition of the present invention can be obtained by mixing, with a liquid crystal polymer, (i) a fibrous filler having a long-fiber percentage of 2.5% or less or (ii) a fibrous filler having a long-fiber percentage of 2.5% or less and a number average fiber length of 76 µm or less which fibrous filler is in an amount of preferably 25 wt % to 40 wt % and more preferably 33 wt % to 40 wt % so that the total weight of the liquid crystal polymer and the fibrous filler is 100 wt %, and thereafter subjecting the mixture to a process such as melt-kneading.

Further, a liquid crystalline resin composition (i) containing a liquid crystal polymer and a fibrous filler having a long-fiber percentage of 2.5% or less and a number average fiber length of 76 µm or shorter and (ii) having a surface Young's modulus of 3700 MPa or less can be obtained by mixing, with the liquid crystal polymer having a Young's modulus of 3700 MPa or less, a fibrous filler having a long-fiber percentage of 2.5% or less and a number average fiber length of 76 µm or shorter which fibrous filler is in an amount of preferably 33 wt % to 37 wt % so that the total weight of the liquid crystal polymer and the fibrous fiber is 100 wt %, and thereafter subjecting the mixture to a process such as melt-kneading. Since the surface Young's modulus of a liquid crystalline resin composition depends on the Young's modulus of a liquid crystal polymer from which the liquid crystalline resin composition is made, the surface Young's modulus of the liquid crystalline resin composition can be changed as appropriate by using a different liquid crystal polymer.

Note that (i) the number average fiber length and the long-fiber percentage of a fibrous filler contained in a liquid crystalline resin composition and (ii) the surface Young's modulus of the liquid crystalline resin composition can be measured by methods described in Examples (described later).

(3. Contact Electronic Component)

A contact electronic component of the present invention includes a molded product of the present invention. The contact electronic component is not limited, provided that it has a movable contact. Examples of the contact electronic component include relays, switches, and connectors.

Most contact failures in a contact electronic component are caused by an insulator (e.g., a fibrous filler and/or resin dust which fall off from a molded product) being caught in a gap between contact points of the contact electronic component. According to the molded product of the present invention, less fibrous filler is exposed on a surface of the molded product. Therefore, even when a force such as friction is applied, falling-out of the fibrous filler and resin dust generation are prevented. Therefore, a contact electronic component in accordance with the present invention makes it possible to significantly reduce the frequency of occurrence of contact failure, and thus possible to stably provide desired performances.

The contact electronic component can be produced by a conventional method. A molded product of the present invention for use in the contact electronic component can be obtained by injection-molding a liquid crystalline resin composition of the present invention into a desired shape required for each component.

EXAMPLES

The following description will discuss the present invention in detail on the basis of Examples. Note, however, that the present invention is not limited to the following Examples.

[Measurement Methods]

(1. Measuring Number Average Fiber Length, Long-Fiber Percentage, Surface Young's Modulus, and Fibrous Filler's Exposed Area Percentage)

In Examples and Comparative Examples, the number average fiber length of a fibrous filler was measured by the following method. That is, a molded product was incinerated in accordance with ISO 6245, and fibrous fillers were collected. 1000 or more fibrous fillers thus collected were observed under a microscope (BX60M-VM-1 produced by Olympus Corporation) at 70× magnification, and the fiber length of each of the fibrous fillers was measured with use of an image processing software (Quick Grain produced by inotech KK). Then, the number average fiber length was found from the lengths of the fibrous fillers, and was used as the number average fiber length of the fibrous filler.

The long-fiber percentage is a percentage of fibrous fillers having a fiber length of 200 µm or longer in the fibrous filler contained in the molded product. The long-fiber percentage can be found by calculating, from a normal distribution which is calculated from the number average fiber length and dispersion ($\sigma^2$) of the fiber length, a proportion of the fibrous fillers having a fiber length of 200 µm or longer.

Figure 2:
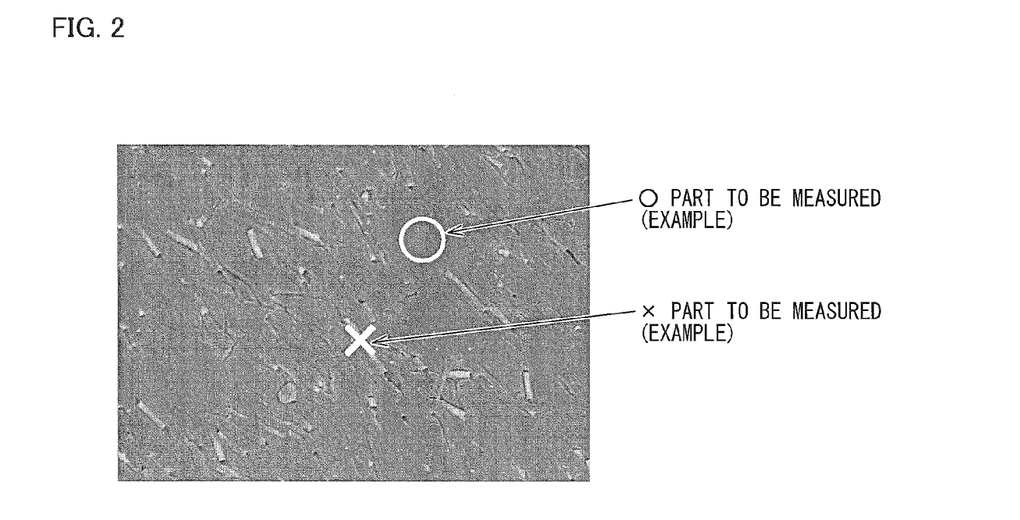
FIG. 2 is a conceptual view showing how to select a part on a surface of a molded product in which part surface Young's modulus is measured.

In Examples and Comparative Examples, a surface Young's modulus of a molded product was measured in the following manner. Young's modulus of a part of the molded product in which part no fibrous filler is exposed was measured with FISCHER SCOPE (H100C by Fischer Instruments K.K.) under the following conditions: depth of measured point: 10 µm, test force: 150 mN, application: 10 seconds, and creep: 1 second, and the Young's module thus measured was used as the surface Young's module. FIG. 2 is a conceptual view showing in which part the surface Young's modulus is to be measured. In FIG. 2, a part that looks bright is a fibrous filler which is exposed on the surface of the molded product, and the other part is a liquid crystal polymer. The part indicated by "O Part to be measured (example)" is a part where no fibrous filler is exposed on the surface of the molded product. Therefore, the surface Young's modulus is measured in such a part. A part indicated by "X Part to be measured (example)" is a part where a fibrous filler is exposed on the surface of the molded product. Therefore, such a part is not suitable for measurement of the surface Young's modulus.

In Examples and Comparative Examples, fibrous filler's exposed area percentage was measured in the following manner. That is, a surface of a terminal end portion of a molded product was observed under FE-SEM (S-4700 produced by Hitachi) at 70× magnification with an accelerating voltage of 15 kV. A compositional image in backscattered electron mode was obtained by a YAG detector, and the image was analyzed with use of an image processing software (Quick Grain produced by inotech KK), whereby the proportion of the area of an observed fibrous filler to the area of an observed part was found. The proportion thus found was used as the fibrous filler's exposed area percentage. Note that the "surface" includes a depth of 3 µm from the outer surface of the molded product.

(2. Tape Peeling Test)

Pellets made of a liquid crystalline resin composition (described later in Examples and Comparative Examples) were molded with an injection molding machine (Fanuc 30αB by FANUC CORPORATION) at an injection molding temperature between 300° C. to 400° C. into a thin-walled, box-shaped molded product with one open side. The size of the box-shaped molded product obtained was as follows: 18 mm in width×10 mm in depth×10 mm in height, and 0.3 mm in thickness.

A piece of cellophane tape was stuck to a surface of the box-shaped molded product by applying a constant load (5.0 N to 5.3 N) with use of a force gauge (ZP-500N produced by Imada Co., Ltd.), and the piece of cellophane tape was peeled off from the surface of the molded product within a predetermined time period (0.5 seconds to 1.0 second). Then, an image processing software (Photoshop by Adobe) was used to find a proportion of the area of a liquid crystal polymer adhered to the piece of cellophane tape to the area of a part of the piece of cellophane tape which part was stuck to the box-shaped molded product (i.e., the area of a face of 18 mm in width×10 mm in depth).

The results of the test were determined in the following manner: when the proportion was 11% or greater, the molded product was regarded as a defective product. This is because, when the proportion is 11% or greater, the molded product tends to cause contact failure.

(3. Measurement of after-Reflow Exposed Area Increase)

Molded products obtained in Examples and Comparative Examples were subjected to a reflow test. That is, each of the molded products was subjected to reflow temperatures with use of a reflow scope (core9050b produced by CORES Corporation) at 160° C. to 220° C. for 120 seconds, at 220° C. to 250° C. for 60 seconds, and at 250° C. to 260° C. for 10 seconds. After the test was conducted once, the fibrous filler's exposed area percentage on a surface of the molded product was measured by the method described in (1.). Then, a difference between the fibrous filler's exposed area percentage before the test and that after the test was found, and was used as the after-reflow exposed area increase.

The results of the measurement were determined in the following manner: if the after-reflow exposed area increase was 0.2% or more, the molded product was regarded as a defective product. This is because, if the after-reflow exposed area increase is 0.2% or more, a fibrous filler extending through the surface of the molded product tends to fall out when, for example, the fibrous filler makes contact with another object, and this is not preferable in practical use. In Table 1 (provided later), the after-reflow exposed area increase of less than 0.2% is indicated as "none", whereas the after-reflow exposed area increase of, for example, 0.2% is indicated as "+0.2".

(4. Scratch Test)

To each of the molded products obtained in Examples and Comparative Examples, a constant load (1N) was applied with a copper protrusion of R=0.3 mm. Then, the copper protrusion was slid 100 times at 100 mm/s along a straight line 10 mm in length. An end portion of a scratch made by the sliding was observed under FE-SEM (S-4700 produced by Hitachi) at 300× magnification. The scratch was 10 μm in depth.

Figure 3:
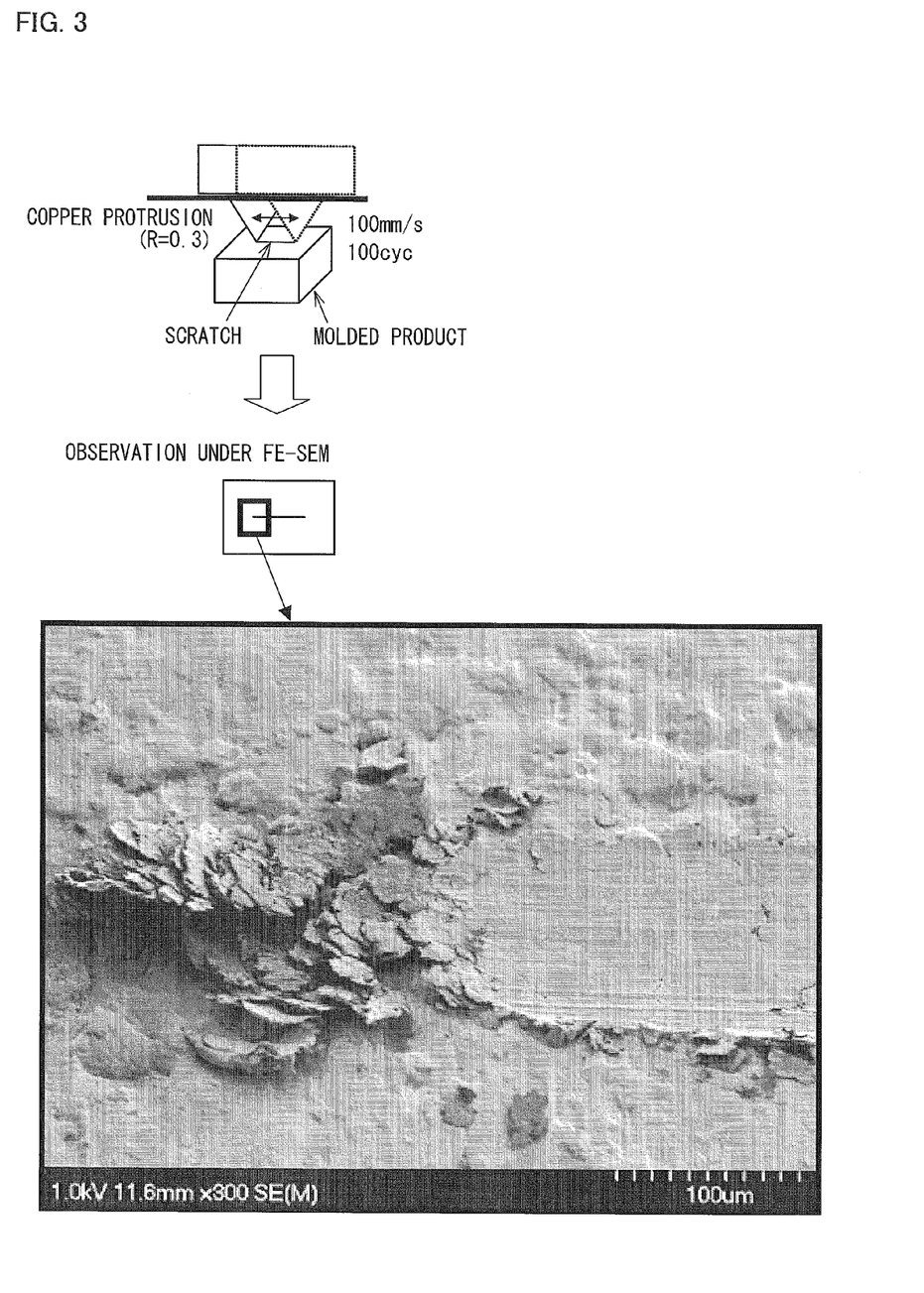
FIG. 3 is a view schematically showing (i) how a scratch test is conducted and (ii) a scratch observed under FE-SEM.

FIG. 3 is a view schematically showing (i) how a scratch test is conducted and (ii) a scratch observed under FE-SEM. The "end portion of the scratch" means one of both ends of a scratch made on the molded product as a result of the sliding of the copper protrusion.

The results of the scratch test were determined in the following manner: if resin dust equal to or longer than 50 μm was not generated, the molded product was regarded as passed. This is because, if resin dust equal to or longer than 50 μm is generated, it is highly likely that the resin dust falls off when a force (e.g., friction) is applied, and it becomes caught in a gap between contact points and causes contact failure when the molded product is used in a contact electronic component.

Note that the "resin dust" means a liquid crystal polymer peeled off from the surface of the molded product at an end of the scratch. The "resin dust equal to or longer than 50 μm" means resin dust which is 50 μm or more in length. The definition of the "resin dust equal to or longer than 50 μm" is as follows. For example, when the resin dust is observed under a microscope, (i) if a two-dimensional shape of the resin dust is substantially circular, the diameter of the circle is 50 μm or greater, (ii) if the two-dimensional shape of the re sin dust is substantially elliptical, a major axis of the ellipse is 50 μm or greater, (iii) if the two-dimensional shape of the resin dust is substantially square, the length of a side of the square is 50 μm or greater, and (iv) if the two-dimensional shape of the resin dust is substantially rectangular, the length of a long side of the rectangle is 50 μm or greater. Further, if a two-dimensional shape of the re sin dust is an irregular shape, the phrase "resin dust equal to or longer than 50 μm" means that a distance between two points on a periphery of the two-dimensional shape may be 50 μm or longer.

Example 1

35 wt % EPG70M-01N (fibrous filler, produced by Nippon Electric Glass Co., Ltd.) and 65 wt % LX70G35F (liquid crystal polymer, produced by Toray Industries, Inc.) containing no fibrous filler were placed in a twin screw extruder KZW 15TW-45MG-NH (produced by TECHNOVEL CORPORATION), and were melt-kneaded to obtain pellets. Note that all the fibrous fillers used in Examples 1 through 6 were those made of glass fibers.

Next, the pellets thus obtained were molded into a molded product at an injection molding temperature of 320° C. with use of an injection molding machine (Fanuc30αB produced by FANUC CORPORATION). The molded product thus obtained was measured for a number average fiber length and a long-fiber percentage of the fibrous filler, a surface Young's modulus, and a fibrous filler's exposed area percentage of the fibrous filler. Table shows values obtained as a result of the measurement. Further, the molded product thus obtained was subjected to the foregoing tape peeling test and the foregoing scratch test, and was measured for an after-reflow exposed area increase. Table 1 also shows the results of these tests and measurement.

TABLE 1

| | FIBROUS FILLER'S EXPOSED AREA PERCENTAGE (%) | AVERAGE FIBER LENGTH (μm) | AMOUNT OF FIBROUS FILLER CONTAINED IN MOLDED ARTICLE (WT %) | LONG-FIBER PERCENTAGE (%) | SURFACE YOUNG'S MODULUS OF MOLDED ARTICLE (MPa) | EVALUATION | | |
|---|---|---|---|---|---|---|---|---|
| | | | | | | TAPE PEELING (%) | AFTER-REFLOW EXPOSED AREA INCREASE | SCRATCH (RESIN DUST) |
| EXAMPLE 1 | 0.2 | 69 | 35 | 2.5 | 3100 | 9 | NONE | NO |
| EXAMPLE 2 | 0.3 | 76 | 33 | 2.2 | 3100 | 9 | NONE | NO |
| EXAMPLE 3 | 0.2 | 69 | 37 | 2.5 | 3700 | 10 | NONE | NO |
| EXAMPLE 4 | 0.2 | 69 | 35 | 2.5 | 2600 | 8 | NONE | NO |
| EXAMPLE 5 | 0.4 | 50 | 40 | 0.1 | 4200 | 10 | NONE | YES |
| EXAMPLE 6 | 0.4 | 69 | 40 | 2.2 | 4000 | 8 | NONE | YES |
| COMPARATIVE EXAMPLE 1 | 0.5 | 82 | 35 | 3.2 | 3100 | 23 | +0.2 | NO |
| COMPARATIVE EXAMPLE 2 | 0.5 | 77 | 40 | 3.2 | 4200 | 10 | +0.4 | YES |
| COMPARATIVE EXAMPLE 3 | 0.5 | 79 | 30 | 3.4 | 2600 | 27 | +0.2 | NO |

Examples 2

The same operations as in Example 1 were repeated except that 33 wt % EPG70M-01N (fibrous filler, produced by Nippon Electric Glass Co., Ltd.) and 67 wt % LX70G35F (liquid crystal polymer, produced by Toray Industries, Inc.) containing no fibrous filler were used. In this way, a molded product was obtained. The results are shown in Table 1.

Example 3

The same operations as in Example 1 were repeated except that 37 wt % EPG70M-01N (fibrous filler, produced by Nippon Electric Glass Co., Ltd.) and 63 wt % LX70G35F (liquid crystal polymer, produced by Toray Industries, Inc.) containing no fibrous filler were used. In this way, a molded product was obtained. The results are shown in Table 1.

Example 4

The same operations as in Example 1 were repeated except that 35 wt % EPG70M-01N (fibrous filler, produced by Nippon Electric Glass Co., Ltd.) and 65 wt % LX70G35F (liquid crystal polymer, produced by Toray Industries, Inc.) containing no fibrous filler were used. In this way, a molded product was obtained. The results are shown in Table 1.

Reference Example 1

The same operations as in Example 1 were repeated except that 40 wt % PF70E-001 (fibrous filler, produced by Nitta Boseki Co., Ltd.) and 60 wt % E6008MR (liquid crystal polymer, produced by Sumitomo Chemical Co., Ltd.) containing no fibrous filler were used. In this way, a molded product was obtained. The results are shown in Table 1.

Reference Example 2

The same operations as in Example 1 were repeated except that 40 wt % EPG70M-011N (fibrous filler, produced by Nippon Electric Glass Co., Ltd.) and 60 wt % E6008MR (liquid crystal polymer, produced by Sumitomo Chemical Co., Ltd.) containing no fibrous filler were used. In this way, a molded product was obtained. The results are shown in Table 1.

Comparative Example 1

The same operations as in Example 1 were repeated except that 35 wt % SS05C-404 (fibrous filler, produced by Nitto Boseki Co., Ltd.) and 65 wt % LX70G35F (liquid crystal polymer, produced by Toray Industries, Inc.) containing no fibrous filler were used. In this way, a molded product was obtained. The results are shown in Table 1.

Comparative Example 2

The same operations as in Example 1 were repeated except that 40 wt % EFH100-01 (fibrous filler, produced by Central Glass Co., Ltd.) and 60 wt % E6008MRB (liquid crystal polymer, produced by Sumitomo Chemical Co., Ltd.) containing no fibrous filler were used. In this way, a molded product was obtained. The results are shown in Table 1.

Comparative Example 3

The same operations as in Example 1 were repeated except that 30 wt % EPG70M-80A (fibrous filler, produced by Nippon Electric Glass Co., Ltd.) and 70 wt % LX70G35F (liquid crystal polymer, produced by Toray Industries, Inc.) containing no fibrous filler were used. In this way, a molded product was obtained. The results are shown in Table 1.

As shown in Table 1, molded products obtained in Examples 1 through 4 and Reference Examples 1 and 2 each had a fibrous filler's exposed area percentage of 0.4% or less. This means that less fibrous filler was exposed. Such molded products each had an after-reflow exposed area increase of less than 0.2%. This means that, in these molded products, the fibrous filler is less likely to fall off even after heat history. Furthermore, each of such molded products had a good result also on the tape peeling test. Regarding the scratch test, the molded products of Examples 1 through 4 did not generate resin dust equal to or longer than 50 μm.

In Reference Example 1, the molded product had a good result on the tape peeling test, but resin dust was observed. The reason therefor seems to be as follows. The molded products obtained in Reference Examples 1 and 2 were highly resistant to a relatively light load such as that applied in the tape peeling test, but not to a heavy load such as that applied in the scratch test and did not reach a point where resin dust generation was suppressed.

The reasons for the above results seem to be as follows. Since each of the molded products obtained in Reference Examples 1 and 2 contains the fibrous filler in an amount of 40 wt % which is larger than those in Examples 1 through 4, the molded products obtained in Reference Examples 1 and 2 are more prone to friction at joined portions of the fibrous filler and the liquid crystal polymer, as compared to those of Examples 1 through 4. Furthermore, since the surface Young's moduli of the molded products obtained in Reference Example 1 and Reference Example 2 were 4200 MPa and 4000 MPa, respectively, which were higher than those of Examples 1 through 4, resin dust was likely to be generated when a force stronger than anchoring is applied between liquid crystal polymers.

However, each of the molded products obtained in Reference Examples 1 and 2 has an after-reflow exposed area increase of less than 0.2%. This means that falling-out of the fibrous filler from each of the molded products is fully suppressed even after heat history. In practical use, it is very important to suppress the after-reflow exposed area increase to obtain a molded product in which a fibrous filler is less likely to fall out and less resin dust is generated. Therefore, it can be said that the molded products obtained in Reference Examples 1 and 2 are of value for attaining the object of the present invention. Therefore, a molded product having a fibrous filer's exposed area percentage of 0.4% or less is also encompassed in the scope of the present invention.

Each of the molded products obtained in Examples 1 through 4 has a fibrous filler's exposed area percentage of 0.3% or less, and shows excellent results on the tape peeling test, the measurement of the after-reflow exposed area increase, and the scratch test. Therefore, it can be said that the molded products obtained in Examples 1 through 4 are those in which falling-out of the fibrous filler and resin dust generation are suppressed more effectively.

The molded products obtained in Comparative Examples 1 through 3, each of which has a fibrous filler's exposed area percentage of greater than 0.4%, did not show a satisfactory result in any of the following: the tape peeling test, the after-reflow exposed area increase, and the scratch test. This seems to be because, since each of the molded products has a long-fiber percentage of as high as more than 2.5%, falling-out of the fibrous filler and resin dust generation are highly likely to occur.

As has been described, a molded product of the present invention is a molded product, formed by injection molding of a liquid crystalline resin composition, including a fibrous filler and a liquid crystal polymer, the fibrous filler having an area that is exposed on a surface of the molded product, the area of the fibrous filler accounting for 0.4% or less of a surface area of the molded product.

Therefore, it is possible to fully suppress falling-out of the fibrous filler and resin dust generation, even when a force (e.g., friction) is applied to the molded product. Further, less fibrous filler is exposed on the surface of the molded product even after heat history in practical use such as reflow. This makes it possible to provide a contact electronic component which is much less prone to contact failure and is capable of stably providing desired performances.

The molded product of the present invention is preferably arranged such that the area of the fibrous filler which area is exposed on the surface of the molded product accounts for 0.3% or less of the surface area of the molded product.

As will be described in Examples, in a case where the molded product is arranged such that the area of the fibrous filler which area is exposed on the surface of the molded product accounts for 0.4% of the surface area of the molded product, although the area, which is exposed on the surface of the molded product, of the fibrous filler did not increase even after the molded product was subjected to reflow, resin dust was generated when a relatively heavy load was applied to the molded product in the scratch test. On the other hand, in a case where the molded product is arranged such that the area of the fibrous filler which area is exposed on the surface of the molded product accounts for 0.3% or less, the area, which is exposed on the surface of the molded product, of the fibrous filler did not increase and the resin dust was not generated even after the scratch test.

As such, according to the arrangement, it is possible to suppress falling-out of a fibrous filler and resin dust generation even when a stronger force is applied to the molded product. Therefore, such a molded product is much less prone to contact failure when used in a contact electronic component.

The molded product of the present invention is preferably arranged such that 2.5% or less of the fibrous filler included in the molded product has a fiber length of 200 μm or longer (a percentage of fibrous fillers having a fiber length of 200 μm or longer in the fibrous filler contained in the molded product is hereinafter referred to as a "long-fiber percentage").

The inventors of the present invention have ascertained that long fibrous fillers having a fiber length of 200 μm or longer are likely to be exposed on a surface of a molded product, and this is a major cause of falling-out of the fibrous filler and resin dust generation from the surface of the molded product.

According to the arrangement, the long-fiber percentage is as low as 2.5% or less. Since long fibrous fillers are likely to be exposed on the surface of the molded product, the above long-fiber percentage makes the fibrous filler less exposed on the surface of the molded product. Therefore, when the molded product is used in a contact electronic component, occurrence of contact failure is further reduced.

The molded product of the present invention is preferably arranged such that the fibrous filler included in the molded product has a number average fiber length of 76 μm or shorter.

According to the arrangement, the long-fiber percentage is 2.5% or less and the number average fiber length is low. This means that the amount of long fibrous fillers contained in the molded product, which long fibrous fillers are likely to be exposed on the surface of the molded product, is smaller. Therefore, the arrangement makes it possible to further suppress falling-out of the fibrous filler and resin dust generation from the surface of the molded product.

The molded product of the present invention is preferably arranged such that 2.5% or less of the fibrous filler included in the molded product has a fiber length of 200 μm or longer; the fibrous filler included in the molded product has a number average fiber length of 76 μm or shorter; and the molded product has a surface Young's modulus of 3700 MPa or less.

According to the arrangement, the exposure of the fibrous filler is suppressed, and also the long-fiber percentage and the number average fiber length of the fibrous filler are low. Further, since the molded product has a surface Young's modulus of 3700 MPa or less and thus is relatively flexible, the molded product is even resistant to a heavy load. Therefore, the arrangement makes it possible to strongly suppress falling-out of the fibrous filler and resin dust generation, and also possible to fully suppress an increase in exposed area after heat history by for example reflow.

A liquid crystalline resin composition for a contact electronic component of the present invention is a liquid crystalline resin composition for a contact electronic component, including a fibrous filler and a liquid crystal polymer, 2.5% or less of the fibrous filler having a fiber length of 200 μm or longer.

According to the arrangement, the liquid crystalline resin composition contains a small amount of long fibrous fillers, which are likely to be exposed on the surface of the molded product. Therefore, by subjecting the liquid crystalline resin composition to injection molding, it is possible to provide a molded product in which falling-out of the fibrous filler and resin dust generation are suppressed. As such, the liquid crystalline resin composition can be suitably used as a material for a contact electronic component.

The liquid crystalline resin composition for a material for a contact electronic component in accordance with the present invention is preferably arranged such that the fibrous filler has a number average fiber length of 76 μm or shorter.

According to the arrangement, the long-fiber percentage is 2.5% or less and the number average fiber length is also low. Therefore, when the liquid crystal composition is molded into a molded product, falling-out of the fibrous filler and resin dust generation from the surface of the molded product can further be suppressed. Therefore, the liquid crystalline resin composition can be further suitably used as a material for a contact electronic component.

The liquid crystalline resin composition for a contact electronic component in accordance with the present invention preferably has a surface Young's modulus of 3700 MPa or less.

According to the arrangement, the liquid crystalline resin composition contains a fibrous filler whose long-fiber percentage and number average fiber length are low and is relatively flexible. Therefore, by subjecting the liquid crystalline resin composition to injection molding, it is possible to provide a molded product even resistant to a heavy load. Therefore, the liquid crystalline resin composition can be further suitably used as a material for a contact electronic component.

The liquid crystalline resin composition for a contact electronic component in accordance with the present invention is preferably arranged such that: the fibrous filler, 2.5% or less of which has a fiber length of 200 μm or longer, and which has the number average fiber length of 76 μm or shorter accounts for not less than 33 wt % but not more than 37 wt % of the liquid crystalline resin composition.

A fibrous filler is used in a liquid crystalline resin composition for the purpose of adjusting a flow direction of a liquid crystal polymer so that the liquid crystalline resin composition is easy to mold. According to the arrangement, the liquid crystalline resin composition contains the fibrous filler in an amount appropriate for achieving that purpose. Furthermore, in a case where the liquid crystalline resin composition is molded into a molded product, falling-out of the fibrous filler and resin dust generation can be fully suppressed, and an increase in exposed area after heat history by reflow etc. can also be fully suppressed.

The present invention is not limited to the descriptions of the respective embodiments, but may be altered in various manners within the scope of the claims. An embodiment derived from a proper combination of technical means disclosed in different embodiments is encompassed in the technical scope of the invention.

INDUSTRIAL APPLICABILITY

According to a molded product formed by injection molding of a liquid crystalline resin composition containing a fibrous filler and a liquid crystal polymer in accordance with the present invention, less fibrous filler is exposed on a surface of the molded product, and thus falling-out of the fibrous filler and resin dust generation are prevented even when a force (e.g., friction) is applied to the molded product. This makes it possible to significantly reduce contact failure in contact electronic components such as relays, switches, and connectors. Therefore, the present invention can be widely used in various electric industries and electronic industries etc.

The invention claimed is:

1. A molded product, formed by injection molding of a liquid crystalline resin composition including a fibrous filler and a liquid crystal polymer, wherein an area of the fibrous filler that is exposed on a surface of the molded product accounts for 0.3% or less of a surface area of the molded product, wherein 2.5% or less of the fibrous filler included in the molded product has a fiber length of 200 µm or longer, wherein the fibrous filler included in the molded product has a number average fiber length of 76 µm or shorter, and wherein the molded product has a surface Young's modulus of 2600 MPa or more and 3700 MPa or less.

2. A liquid crystalline resin composition employed as a material for a contact electronic component, comprising a fibrous filler and a liquid crystal polymer, wherein 2.5% or less of the fibrous filler has a fiber length of 200 µm or longer, wherein the fibrous filler has a number average fiber length of the 76 µm or shorter, and wherein the liquid crystalline resin composition has a surface Young's modulus of 2600 MPa or more and 3700 MPa or less.

3. The liquid crystalline resin composition as set forth in claim 2, wherein:

the fibrous filler accounts for not less than 33 wt % but not more than 37 wt % of the liquid crystalline resin composition.

4. A molded product, formed by injection molding of a liquid crystalline resin composition as set forth in claim 2.

5. A contact electronic component comprising a molded product as set forth in claim 1.

* * * * *